United States Patent [19]

Blaschek et al.

[11] Patent Number: 4,826,116

[45] Date of Patent: May 2, 1989

[54] TIPPING DEVICE FOR A MOVIE-CAMERA-SUPPORTING CRADLE

[75] Inventors: Otto Blaschek, Dornach; Kurt Wallner, Dietersheim, both of Fed. Rep. of Germany

[73] Assignee: Arnold & Richter Cine Technik GmbH & Co. Betriebs KG, Munich, Fed. Rep. of Germany

[21] Appl. No.: 100,549

[22] Filed: Sep. 24, 1987

[30] Foreign Application Priority Data

May 7, 1987 [EP] European Pat. Off. ........ 87890091.9

[51] Int. Cl.$^4$ .............................................. F16M 11/04
[52] U.S. Cl. .................................... 248/185; 248/130
[58] Field of Search ............... 248/182, 184, 185, 178, 248/179, 183, 130, 139, 141; 354/293; 108/9; 474/156

[56] References Cited

U.S. PATENT DOCUMENTS

| 1,840,556 | 1/1932 | Arnold | 248/183 X |
| 2,162,042 | 6/1939 | Welser | 474/156 |
| 2,667,792 | 2/1954 | Bendall | 474/156 X |
| 2,796,226 | 6/1957 | Dalton et al. | 248/183 |
| 3,740,011 | 6/1973 | Dickson | 248/183 |
| 4,040,587 | 8/1977 | Gottschalk | 248/185 |
| 4,116,081 | 9/1978 | Luttrell | 474/156 |

FOREIGN PATENT DOCUMENTS

| 427061 | 3/1926 | Fed. Rep. of Germany ...... 248/185 |
| 2311250 | 4/1976 | France . |
| 174056 | 7/1922 | United Kingdom . |
| 846970 | 9/1960 | United Kingdom . |
| 1386670 | 3/1975 | United Kingdom . |

OTHER PUBLICATIONS

Machine Design, "Chains and Chain Drives," Jun. 27, 1985, pp. 12 and 20.

*Primary Examiner*—J. Franklin Foss
*Attorney, Agent, or Firm*—Cushman, Darby & Cushman

[57] ABSTRACT

A tipping device for a movie camera or for the cradle (3) connected thereto is swivel-mounted in rollers (8) by means of skids (6). The cradle (3) is connected to a link chain (15) which is in mesh with chain wheels (21). By means of such a traction means the rotary motions applied to a crank can be transmitted with precision to the cradle (3), free from play, in order to swivel the same.

10 Claims, 3 Drawing Sheets

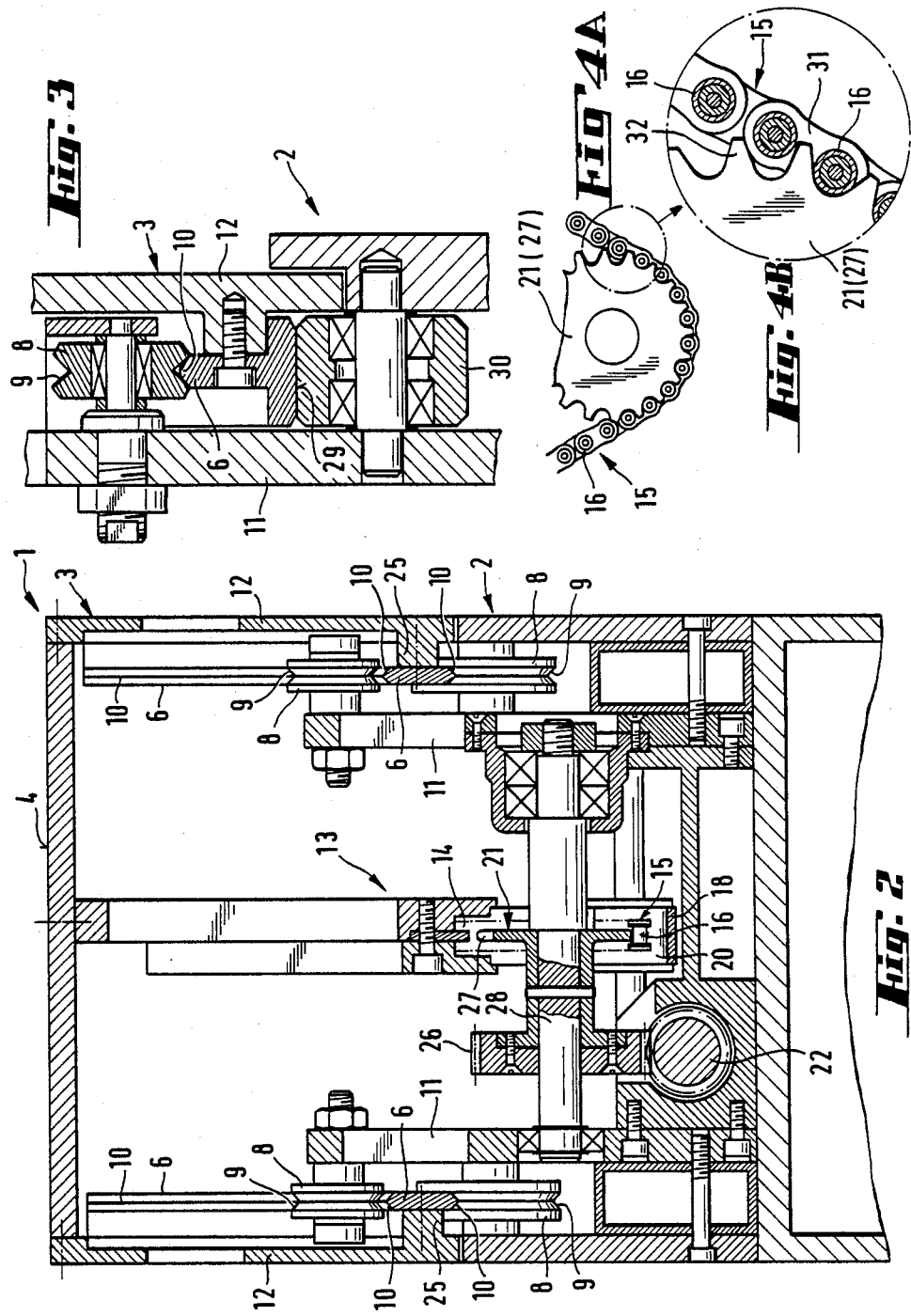

TIPPING DEVICE FOR A MOVIE-CAMERA-SUPPORTING CRADLE

The invention relates to a tipping device for a movie-camera-supporting device having a bearing mount for guiding the cradle's arched skids on rollers which are connected to the bearing mount, and a flexible traction means operated by a gear drive and connected on the terminal end to the cradle.

Such a tipping device is taught by Accepted West German Specification No. 261 5 647. Here, a cradle connected to the movie camera is gripped with each of its arched skids between pairs of rollers affixed to a bearing mount and can therefore be adjusted along the circular arc relative to the bearing mount. One flexible traction means at a time, in the form of a toothed belt, is secured in each of the longitudinal terminal area of the cradle, which traction means is in mesh with a gear drive supported in the bearing mount. The gear drive is mounted on a bearing rail swivel-mounted on the bearing mount. A thusly designed tipping device has the disadvantage that the toothed belt is subject to load-and temperature-dependent stretching, so that it often requires tightening. Furthermore, the toothed belt is subject to varying degrees of wear along its length, since the horizontal swings in a slight deviation from the horizontal line are much more frequent than in the outermost swivel areas. In addition, because of the gripping of the cradle skids between one pair of rollers, accurate guidance exists only in the swivel plane. There is no accurate or low-friction guidance in the plane perpendicular to the swivel plane.

It is also old in the art to use a cable as a flexible traction means for swivelling the cradle. However, this has above all the disadvantage that the cable tension must be maintained accurately. If it diminishes, it must first be readjusted.

Another common practice is to attach to the cradle a gear segment which is in mesh with a gear supported on the bearing mount. Here, the disadvantage is that after adjustment in the vertical direction by bringing the gear into position on the gear segment, the easy motion of the mechanism is lost, or that after horizontal readjustment of the gear segment horizontally, it will slip off from the gear in the course of time.

Therefore, the object of the invention is to provide a tipping device of the type referred to in the introduction, which can be made with relatively little complexity, while avoiding the known drawbacks and which, after extended use, will still enable the movie camera to execute accurate tipping motions.

This object of the invention is achieved with a tipping device of the type mentioned in the introduction by designing the traction means as a link chain with rollers driven by a chain wheel. By combining a link chain as traction means with a chain wheel engaging thereinto and by avoiding any change in length, an accurate backlash-free swivelling motion is transmitted to the cradle. This sort of precision and freedom from play that can be achieved can particularly be improved in the cradle's long-time performance if, in one modification of the invention, chain wheel and/or rollers are hardened.

According an advantageous modification of the invention, the skids have longitudinally placed projections that engage in a suitable flute-type recess in the rollers. The groove/flute-type guidance enables transverse forces to be absorbed without difficulty, while maintaining an accurate guidance in longitudinal direction. Furthermore, the skids can be guided accurately in the flute-type recess.

In a preferred embodiment of the invention, the pitch of the sprocket wheel is made smaller than the pitch of the chain. With such matching of link chain and chain wheel, a jerky motion can be avoided with assurance, because as soon as a tooth flank of the chain wheel is released from the chain link, the next tooth flank already becomes friction-locked with a chain link.

In another advantageous embodiment of the invention, the side of the link chain facing away from the cradle is covered by a flexible strip connected on the terminal end in both terminal areas to the cradle, which strip in the area of the gear drive is spaced from the link chain by idler wheels and is guided between gear drive and bearing mount. With such a covering, any pulling in of foreign objects by the link chain, which would interfere with the swivelling motion, is avoided with assurance. Also, this covering practically rules out any injuries. Since in the area of the chain wheel the strip is spaced thereby, the engagement of the chain wheel in the link chain is not interfered with in any way.

According to another modification of the invention, the strip can be made made of flexible design and is subjected to tensile stress to ensure that the strip is always urged against the link chain in order to completely cover the same.

In another preferred embodiment of the invention, the link chain and the strip are guided in an arched channel connected to the cradle. This type of channel having the same curvature as the skids ensures that both the ink chain and the strip—independently of the cradle's position relative to the bearing mount—are always guided in the best possible position in relation to the chain wheel or the idler wheels.

In yet another modification of the invention, the link chain in the area of the chain wheel can be guided around a tension roller that can be adjusted and fixed perpendicularly to its axis. With this tension roller, the tension of the link chain can be quickly and accurately adjusted without taking the tipping device apart.

However, also at least one end of the link chain can be connected to a turnbuckle, the other end of which is connected to the cradle. With this design as well, the chain can be tensioned in very simple fashion.

In another advantageous embodiment of the invention, the skids are in contact merely on their side facing away from the cradle with the rollers attached to the bearing mount. With a pan and tilt head, which is thusly supported merely on the rollers and which is urged against the rollers by the link chain, which, after all is guided around the chain wheel retained on the bearing mount, a very easy, low-friction swivelling motion can be carried out.

Finally, in another modification of the invention, a crank connected to the bearing mount is coupled to the gear drive via a cardan shaft and is designed to swing out sideways in the horizontal plane. This design widens the swivelling range of the cradle together with the movie camera affixed thereto.

In the following section, the invention will be described with reference to embodiments shown in the accompanying drawings, in which:

FIG. 2 is a cross-sectional view of the tipping device taken along the line B—B;

FIG. 3 is an alternative embodiment of the skid mount or skid structure;

FIG. 4A is a side view of a chain wheel and of a link chain of the invention;

FIG. 4B is an enlarged view of the encircled portion of FIG. 4A; and

Figure 1:
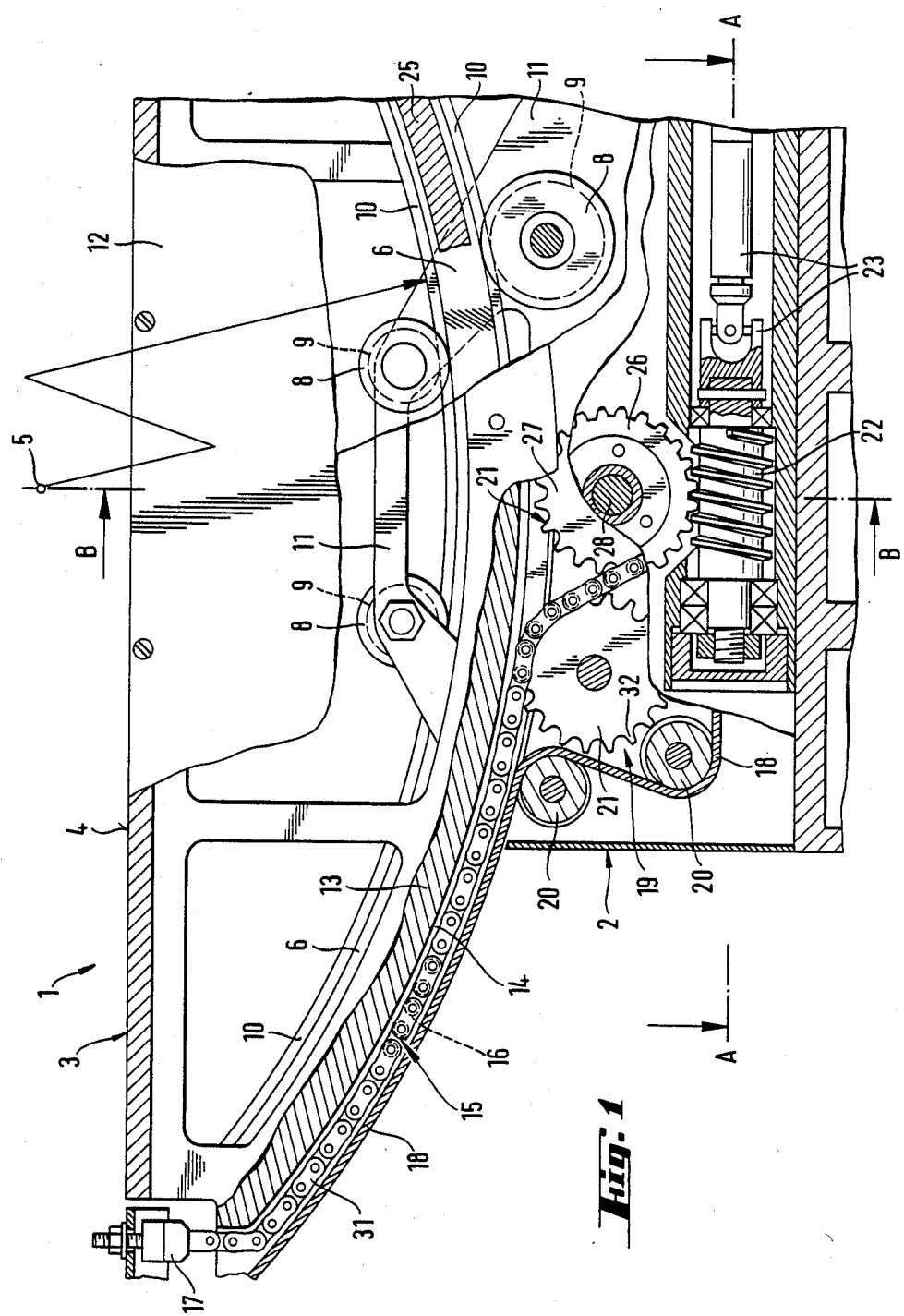
FIG. 1 is a side view with a partial longitudinal section through a tipping device incorporating the invention for a movie-camera-supporting cradle.

A tipping device 1 shown in FIG. 1 essentially consists of a bearing mount 2, which is connected to a tripod not shown and a cradle 3 which can swivel or tip to the bearing mount 2. This cradle 3, provided on its top surface 4 with a cradle 3 to locate a movie camera has on its bottom side two skids 6 spaced apart in the swivel axis 5 and which have on their top and bottom sides longitudinally placed projections 10, which engage in a suitable flute-type recess 9 in the rollers 8 (FIG. 2). The rollers 8, which fix the skids 6 at both ends, pivot on a support 11 connected to the bearing mount 2. The cradle 3 has two side walls 12 placed laterally to the top surface 4 and are connected thereto.

As readily apparent from FIG. 2, an arched support 13 is connected to the top surface 4 midway between the two side walls 12 of the cradle 3, which support has a curvature corresponding to one of the skids 6. This arched support 13 has on its bottom side a recess 14 to locate a link chain 15 depicted in FIG. 1. One end of the link chain having preferably hardened rollers 16 is connected to a turnbuckle 17, which itself is connected to the top surface 4 of the cradle 3. The side of the link chain 15 facing away from the cradle 3 is covered by a flexible strip 18 connected on the terminal end in both terminal areas to the cradle 3, which strip 18 in the area of a gear drive 19 situated in the bearing mount 2 is spaced by idler wheels 20 from the link chain 15 and is guided between the gear drive 19 and the bearing mount. The strip is of flexible design and is constantly subjected to a tensile stress so as to provide the link chain 15 with a reliable covering. In addition to locating and guiding the link chain 15, the U-shaped recess 14 in the arched support 13 also serves to locate and guide the strip 18. The gear drive 19, provided to transmit the tensile forces to the link chain 15, consists of three tandem-connected, preferably hardened, chain wheels, which link chain 15 is guided from the top side of the outer chain wheels 21 to the bottom side of the central chain wheel 21.

Figure 5:
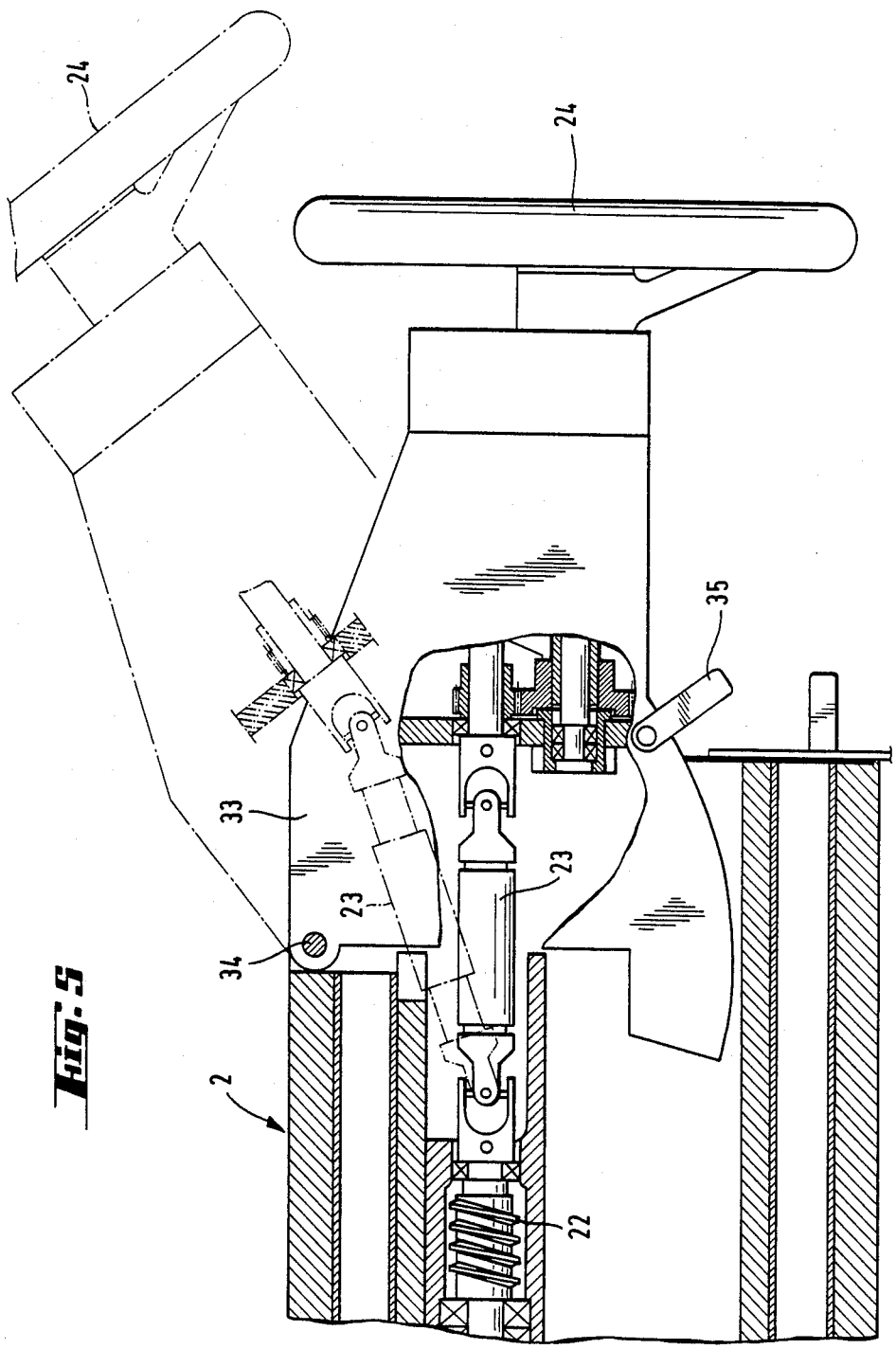
FIG. 5 is a longitudinal sectional view of the bearing mount taken along the line A—A in FIG. 1, with a swung-out crank.

The central chain wheel 21 is in mesh via the gear 26 with a pinion 22 driven by a cardan joint 23 and which thus enables the crank 24 in FIG. 5 to swing out about its longitudinal axis.

As apparent from FIG. 2, the skids 10 are connected in their central, lower area by a web 25 to the adjoining side wall 10. In this way, an accurate, smooth, backlash-free guidance of the skids in the flute-type recesses 9 in the rollers 8 is possible. The central chain wheel 21 is formed from two axially spaced gears 26, 27, the gear 27 being engaged with the link chain 15, and the other gear 27 being engaged with the pinion 22. On the terminal end, the shaft 28 connected to the chain wheel 21 is supported in the bearing mount 2 by suitable ball bearings.

The skids 6, designed as an alternative in FIG. 3, have merely on their top side a projection 10, which comes to rest in a suitable flute-type recess 9 in the roller 8. However, unlike the embodiment described above and shown in FIGS. 1 and 2, the bottom end of the skids 6 has a broadened supporting surface 29 which, like the skid 6, is also curved. This supporting surface 26 is seated on the two cylindrical bottom rollers 30.

The link chain 15, magnified in FIG. 4, consists of interconnected links 31 hinged to one another in the area of a hardened roller 16. In this case, in order to avoid a jerky motion during successive coggings of the chain wheel with the link chain 15, it is important that the pitch of the link chain 15 be different from that of the chain wheel 21, i.e., the pitch circles must have different forms. As a result, whenever a tooth flank of the chain wheel 21 is released from the link chain 15, the corresponding flank of the next tooth 32 of the chain wheel 21 already becomes friction-locked with the rollers 16 of the link chain 15. The magnitude of the pitch difference is a function of the number of all the teeth 32 engaging in the link chain 15. This, in turn, depends on the outside diameter of the chain wheel 21. Preferably, the pitch of the chain wheel 21 is made smaller than the pitch of the link chain 15.

As indicated by the dot-dashed lines in FIG. 5, the crank 24, connected to the pinion 22 by a cardan shaft 23, can be swung sideways in order to swivel the cradle 3. To this end, the crank mount 33 is attached to the bearing mount 2 by means of a hinge 34. Reference numeral 35 denotes a handle for setting the chosen angle position. The swivelling range of the cradle is advantageously broadened with this flexible mounting of the crank 24. Normally, such camera pans are desired only in exceptional cases, so that for such cases the crank can be swung out sideways from the path of the pan.

We claim:

1. A tipping device for a movie-camera-supporting cradle having a bearing mount for guiding arched skids of the cradle on rollers connected to the bearing mount, and a flexible traction means that can be operated by means of a gear drive and is connected on the terminal end to the cradle, characterized in that the traction means is designed as a link chain (15) with rollers (16) and can be driven by a chain wheel (21), the pitch of said chain wheel (21) being smaller than the pitch of said link chain (15).

2. The tipping device as set forth in claim 1, characterized in that the chain wheel (21) and/or the rollers (16) are hardened.

3. The tipping device as set forth in claim 1, characterized in that the skids (6) have longitudinally placed projections (10) which engage in a suitable flute-type recess (9) in the rollers (8).

4. The tipping device as set forth in claim 1, characterized in that the side of the link chain (15) facing away from the cradle (3) is covered by a flexible strip (18) connected in both terminal areas to the cradle (3), the strip (18) in the area of the gear drive (19) being spaced by idler wheels (20) from the link chain (15) and being guided between the gear drive (19) and the bearing mount.

5. The tipping device as set forth in claim 4, characterized in that the strip (18) is of flexible design and is subjected to tensile stress.

6. The tipping device as set forth in claim 4 characterized in that the link chain (15) and the strip (18) is guided in an arched support (13) connected to the cradle (3).

7. The tipping device as set forth in claim 1 characterized in that the link chain (15) in the area of the chain wheel (21) is guided around an adjustable and fixable tensioning roller perpendicularly to its axis.

8. The tipping device as set forth in claim 1, characterized in that at least one end of the link chain (15) is connected to a turnbuckle (17) coupled with its other end to the cradle (3).

9. The tipping device as set forth in claim 1, characterized in that the skids (6) are connected to the rollers (18) attached to the bearing mount solely on a side thereof which faces away from the cradle (3).

10. The tipping device as set forth in claim 1, characterized in that a crank (24) connected to the bearing mount (2) is coupled by a cardan shaft (23) to the gear drive (19) and is made to swing out sideways in the horizontal plane.

* * * * *